Dec. 13, 1938. R. I. HUFFMAN 2,140,157
HANDLE
Filed March 21, 1938
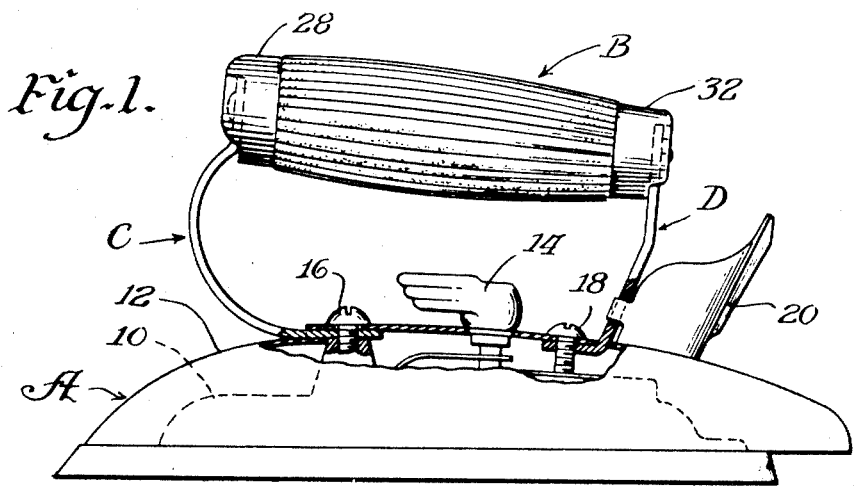
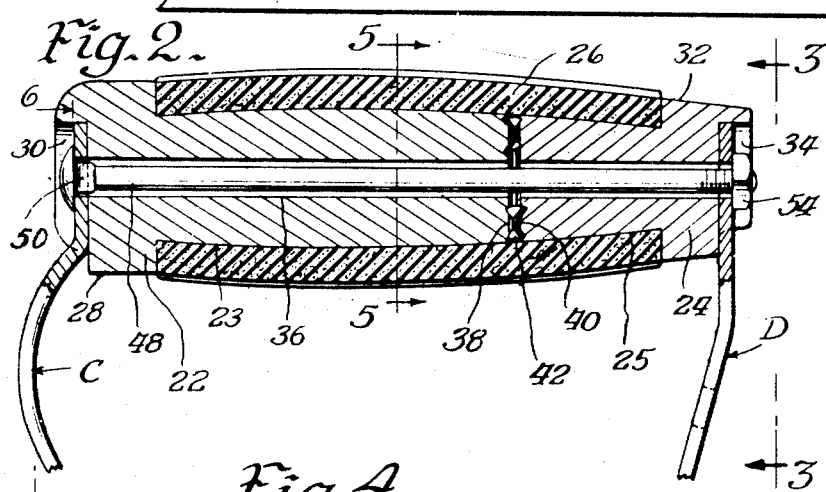
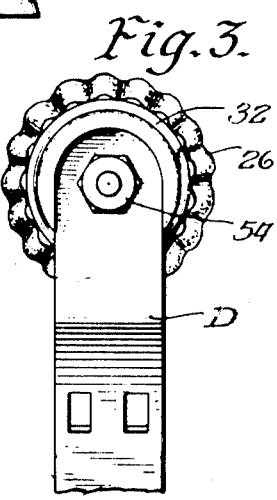
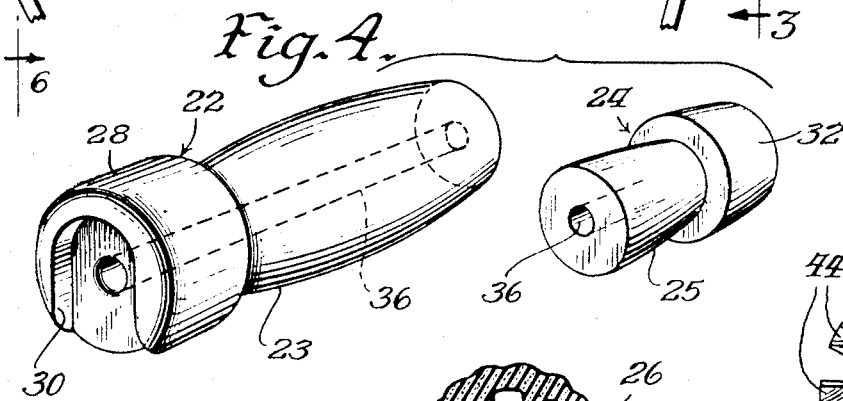
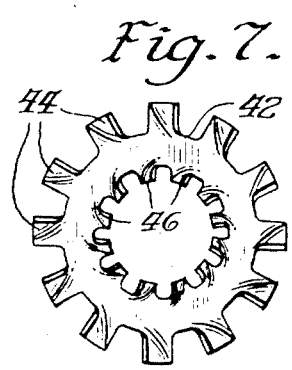
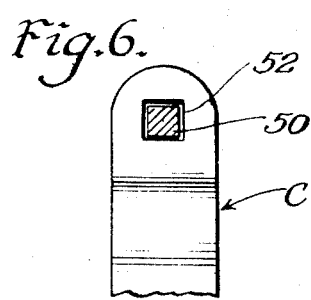
Inventor
Russell I. Huffman
by Bair & Freeman
Attorneys Patented Dec. 13, 1938

2,140,157

UNITED STATES PATENT OFFICE 2,140,157

HANDLE

Russell I. Huffman, Dover, Ohio, assignor to Knapp-Monarch Company, St. Louis, Mo., a corporation of Missouri Application March 21, 1938, Serial No. 197,049

4 Claims. (Cl. 38—90)

My invention relates to handles and particularly to those of the type used in connection with heated appliances to insulate the hand from contact with a heated portion of the appliance. Among the objects of my invention is the provision of a new and improved handle for an appliance which is simple in construction and relatively inexpensive to manufacture.

Another object is the provision of a handle constructed of a core having two parts attached together in such a manner as to prevent relative rotation between the parts.

Still another object is the provision of an insulated handle for a heated appliance which is composed of a core having two parts in end to end position and a relatively soft insulating grip surrounding the core at the point of contact of the two parts, there being provided a means interposed between the parts of the core of such a character that it will bite into the adjacent parts when drawn together by some suitable means in order to prevent a relative rotation between the parts of the core.

A further object is the provision of an insert to be applied between complementary parts of an appliance handle which is adapted when the handle is assembled to interject itself into the adjacent portions of the handle in order that the entire assembly may be a rigid unitary structure.

With these and other objects in view, my invention consists in the construction, arrangement and combination of the various parts of my device, whereby the objects contemplated are attained, as hereinafter more fully set forth, pointed out in my claims, and illustrated in the accompanying drawing, in which:

Figure 1 is a side elevational view of my device shown partially in section.

Figure 2 is a longitudinal section of the handle drawn on a larger scale.

Figure 3 is an end elevational view of the handle on the line 3—3 of Figure 2.

Figure 4 is an exploded view of the core.

Figure 5 is a section on the line 5—5 of Figure 2.

Figure 6 is a section on the line 6—6 of Figure 2; and

Figure 7 is an enlarged view of the locking device insertable between the parts of the core.

In the construction of handles for heated appliances and particularly those which are used on flat irons customarily heated by electricity there is need for a sturdy and rugged handle structure which is at the same time effectively insulated against heat tending to flow from the body of the iron upward through the handle brackets. When it is desired to make a handle of relatively inexpensive materials such as wood, for example, it is necessary to provide recesses for the reception of metallic portions of the handle brackets so as to cover the brackets in a manner to prevent contact with them by the hand of a user. Owing to the fact that wood does not have an extremely great tensile strength, the guarding portions when made as thin as is frequently necessary, are apt to be weak and very easily broken either in the course of manufacture or after being placed into service.

In the particular construction shown, the handle is adapted to be provided with a resilient grip of a rubber-like or similar elastic material which has to be stretched over the central portion of a wood core. The method formerly used for applying the grip to the core has been to stretch the grip over an enlarged end of the core and depend upon the inherent resiliency of the grip to draw itself inward tightly into engagement with a central recessed part of the core after it has been stretched into its proper place. Because of the undue stretching which frequently occurs, the elastic grip is strained somewhat and does not properly tighten itself into place upon the core sufficient to prevent its being rotated when in use. It is highly desirable to have a snug fit between the two so that there will not be any relative rotation between them.

With this end in view a split core has been provided made in two parts separated at the mid portion so that the more or less resilient grip can be stretched over the narrow portion only of both parts of the core thereby making a tight fit because of it being unnecessary to stretch the entire grip over either of the enlarged ends. Because of dividing the core it becomes necessary to provide some means of securely fastening the parts together so that once assembled they will be as rigid as a single piece core.

As shown in the drawing an electric flat iron designated generally by the character A is provided with a handle B attached to the base of the iron by means of the handle brackets C and D. The iron is provided with a sole plate structure 10 surmounted by a shell or casing 12 for housing the operative parts of the iron and a control handle 14 is shown for turning the iron on and off. The handle bracket C is fastened to the casing and sole plate by means of a screw 16 while the handle bracket D is similarly fastened by means of a screw 18, both points of attachment being spaced at a fixed distance apart.

The numeral 20 designates a guard plate for the electric terminals.

The handle B is constructed of a heat resistant material such as wood or a composition and comprises a core having two complementary parts 22 and 24 and a resilient grip portion 26. The part 22 of the grip has an enlarged end 28 which is provided with a radially extending recess 30 adapted to the reception of the bracket C and having a depth sufficient that the bracket will be completely surrounded by the sides of the aperture. A rounded depressed portion 23 is provided forming part of the central portion of the core for reception of one end of the grip 26. Similarly the other part 24 of the grip has an enlarged end 32 and a corresponding recess 34 adapted to the reception of the bracket D. The part 24 has also a depressed portion 25 for reception of the other end of the grip 26 and a central aperture 36 extends centrally through both portions of the core.

The part 22 is provided with a face 38 while the part 24 is provided with a corresponding face 40 which lie adjacent each other when the handle is assembled. Between the faces there is interposed a disc 42 taking the form in the embodiment shown of a double faced lock washer having outer projections 44 and inner projections 46 extending beyond the faces of the washer. A bolt 48 having a square shank 50 receivable into a square hole 52 in the bracket C is provided and has on the opposite end a nut 54 for tightening it in place.

When the device is assembled, the brackets C and D may be clamped in a jig so that they are spaced apart the same distance they would ordinarily occupy when in place upon an iron, a distance equal to the space between the bolts 16 and 18. Then the resilient grip 26 is positioned over the depressed portion 23 of the core part 22, the lock washer is inserted within the grip and the depressed portion 25 of the core part 24 is inserted into the grip. When these are in place the enlarged ends of the core can be rotated so that the radial apertures 30 and 34 are turned in a direction to fit over the corresponding ends of the brackets C and D. Next the bolt 48 is inserted from the forward end through the aperture 52 in the bracket C, through the central hole 36 of the core and then outwardly through an appropriate aperture in the bracket D. The nut 54 is then applied and the bolt drawn tightly into place. The force exerted by the pull upon the bolt forces the somewhat soft faces 38 and 40 of the core parts into engagement with the lock washer 42 so that the projections thereon are embedded deeply into said faces. This having been accomplished it will be impossible to rotate one part of the core with relation to the other and the likelihood of rotating any part of the core with relation to the brackets will be eliminated. The entire assembly can then be removed from the jig and the handle brackets will be precisely positioned in order to fit into place upon the base of the iron.

When the brackets are finally tightened into place, the parts of the handle form a unitary structure which is extremely rigid and of a highly insulated character. Furthermore with the grip portion applied tightly to the core as is permitted with this construction there will be no slipping in a rotational direction when the appliance is used. The hold of the grip 26 upon the core is greatly enhanced by the internal fluted construction of said grip as best observed in Figure 5. This permits the grip to be stretched as much as need be in order to be expanded over the central depressed portion of the core and still retain a maximum of resilience to supply a strong frictional grip between the adjacent surfaces.

Some changes may be made in the construction and arrangement of the parts of my device without departing from the real spirit and purpose of my invention, and it is my intention to cover by my claims, any modified forms of structure or use of mechanical equivalents, which may be reasonably included within their scope.

I claim as my invention:

1. A handle for attachment to a pair of brackets forming part of a heated appliance comprising a core of heat resistant material made up of two complementary parts positioned end to end, the free end of each part being adapted to the reception of said brackets, a grip adapted to encircle the core intermediate the free ends to enclose the space between the adjacent ends of said parts, a disk element having engaging means on the opposite faces thereof adapted to be forced into engagement with the adjacent end faces of said parts, and a bolt like element for forcibly drawing the brackets and said parts together to force engagement of said parts with the disk to prevent relative rotation therebetween.

2. A handle for attachment to a pair of brackets on an electric appliance comprising a wooden core having enlarged ends each provided with a slot for the reception of one of said brackets and made up of two parts placed end to end, a soft grip of insulating material surrounding the handle intermediate the ends, a two faced lock washer having engaging means on opposite faces thereof positioned between the adjacent inner ends of said core and a bolt extending through said core and said washer adapted to draw the parts of the core tightly together so that opposite lock washer faces engage one with each adjacent part of the core and prevent relative rotation therebetween.

3. A handle for an appliance comprising a wooden core made up of two parts placed end to end, a soft grip of insulating material surrounding the handle intermediate the ends, a two faced lock washer positioned between the adjacent inner ends of said core having projections on said faces and a bolt extending through said core, said washer being adapted to draw the parts of the core tightly together so that the projections on opposite lock washer faces bite one into each adjacent part of the core and prevent relative rotation therebetween.

4. A handle for an appliance comprising a core of heat resistant material made up of two complementary parts having adjacent end elements placed face to face, a grip surrounding the handle intermediate the free end elements covering the parting line between adjacent end elements, a disk insertable between the adjacent end elements having engaging means thereon positionable in contact with the faces, and means for drawing said parts together and for drawing the engaging means into contact with said faces to prevent relative rotation therebetween.

RUSSELL I. HUFFMAN.